United States Patent
McClary

(10) Patent No.: US 10,364,791 B2
(45) Date of Patent: Jul. 30, 2019

(54) METHOD AND DEVICE FOR DEEP OCEAN POWER GENERATOR TURBINE

(71) Applicant: Wesley David McClary, George Town, TX (US)

(72) Inventor: Wesley David McClary, George Town, TX (US)

( * ) Notice: Subject to any disclaimer, the term of this patent is extended or adjusted under 35 U.S.C. 154(b) by 0 days.

(21) Appl. No.: 15/454,518

(22) Filed: Mar. 9, 2017

(65) Prior Publication Data

US 2018/0258906 A1 Sep. 13, 2018

(51) Int. Cl.
| F03B 17/00 | (2006.01) |
| F03B 17/06 | (2006.01) |
| F03B 13/22 | (2006.01) |
| F03B 13/26 | (2006.01) |

(52) U.S. Cl.
CPC ............ *F03B 17/062* (2013.01); *F03B 13/22* (2013.01); *F03B 13/264* (2013.01); *F03B 17/065* (2013.01); *F05B 2240/917* (2013.01); *F05B 2240/95* (2013.01); *F05B 2240/97* (2013.01); *Y02E 10/28* (2013.01); *Y02E 10/38* (2013.01)

(58) Field of Classification Search
CPC ....... F03B 17/062; F03B 13/22; F03B 13/264
USPC ...................................... 290/43, 54
See application file for complete search history.

(56) References Cited

U.S. PATENT DOCUMENTS

| 4,095,422 A * | 6/1978 | Kurakake ............. F03B 17/065 290/54 |
| 4,205,943 A * | 6/1980 | Vauthier ............... F03B 17/061 290/54 |
| 4,335,319 A * | 6/1982 | Mettersheimer, Jr. ....................... F03B 17/063 290/54 |
| 5,266,006 A * | 11/1993 | Tsui ........................ F03D 3/067 416/119 |
| 5,440,176 A * | 8/1995 | Haining .................. F03B 13/10 290/42 |
| 6,091,161 A * | 7/2000 | Dehlsen ................... B63G 8/18 290/43 |
| 8,766,466 B2 * | 7/2014 | Dehlsen ................ F03B 17/061 290/43 |
| 2002/0158472 A1 * | 10/2002 | Robson ................. F03B 17/061 290/43 |
| 2003/0201645 A1 * | 10/2003 | Pacheco ................. B60K 16/00 290/54 |
| 2013/0127168 A1 * | 5/2013 | Dragic ................ F03B 13/1855 290/53 |
| 2016/0237984 A1 * | 8/2016 | Hashimoto ........... F03B 13/264 |

* cited by examiner

*Primary Examiner* — Julio C. Gonzalez
(74) *Attorney, Agent, or Firm* — Pham IP Group; Frank H. Pham

(57) ABSTRACT

A method for generating power using a device in deep ocean is disclosed comprising a power generator, a hollow tube turbine platform configured to achieve a desired depth in the deep ocean, a submerging device attached to the turbine platform, a plurality of turbine blades assembly, and at least one power transmission-and-distribution cable.

5 Claims, 6 Drawing Sheets

METHOD AND DEVICE FOR DEEP OCEAN POWER GENERATOR TURBINE

BACKGROUND

1. Field of the Invention

The present invention is a deep ocean power generation. Specifically, the device is used in deep ocean to convert kinetic energy generated from the deep ocean current into electrical energy.

2. Description of Prior Art

Generating a sufficient energy supply to run the world's ever increasingly energy hungry operation has become a goal on which many modern scientists are intensely focused. One suggested methodology by which such energy supplies could be generated in an environmentally friendly manner has consisted of the generator of power using the water power of the world's oceans. Numerous types of such energy harnessing power generators for operation with the world's oceans have been suggested. Such a sustainable alternative energy source is increasingly attractive as the cost of oil rises and the negative effects on the world's environment of traditional energy supply systems become more apparent.

Finding an environmentally friendly and sufficient new energy source is therefore an urgent and beneficial task. Developing power generator by using ocean wave energy is a good option. However, there are problems of insufficient utilization of ocean wave energy and low efficiency of power generating devices in current designs at home and abroad.

Recently, a demonstrative power plant with a power capacity of 20-25 kW located on the coast of British Columbia province in Canada, and the Retrofit Bridge Project located in Tacoma City, Wash. state in United States will set up Davis Hydro Turbines under the bridge. The above projects are still categorized into tidal power plants in shallow sea.

A deep ocean current power plant is the power project in Gulf Stream. The nature of ocean currents in the two places is similar in the depth which is mostly more than hundreds of meters. However, the present invention uses different power plant structure and techniques.

However, none of the aforementioned projects supply adequate energy at modern standards to enable their widespread use. Further, certain programs, such as the deep ocean pipe, might require the creation of technologies not yet available to enable their use. While the above described systems have similarities with the present invention, they differ in material respects. These differences reveal advantages over the prior devices.

SUMMARY OF THE INVENTION

The present invention provides deep ocean power generator device and method that uses deep ocean current energy highly efficiently regarding the problems of insufficient utilization of ocean current energy and low efficiency of power generating devices in current designs at home and abroad.

The present invention is directed generally to a device for power generator turbine and, more particularly, to a deep ocean power generator turbine method and device.

The present invention solves problems experienced with the prior art because it provides for a consistent generator turbine of power. Those and other advantages and benefits of the present invention will become apparent from the detailed description of the invention herein below.

A preferred embodiment of the present invention is to provide a deep ocean power generator turbine, applied in a depth of sea, which is able to convert kinetic energy generated from ocean current into electrical energy.

In another preferred embodiment of the present invention, the device includes a hollow tube platform configured to achieve a desired depth in the deep ocean. The hollow tube platform is substantially attached to the turbine blades that are submerged under water when the submerging device is open for injecting water into the platform.

Still another preferred embodiment of the present invention, each turbine flap is moveably attached to the turbine blade that deep ocean current can go through the openings to make the movements of the turbine to drive the power generator Another embodiment of the present invention, the turbine blades rotate in sequence around a center shaft as the ocean current presses against them. Each turbine blade has multiple moving turbine flaps. The flaps open and shut in unison on each turbine blade. When each turbine blades front side comes in contact with the ocean current flow during rotation, the turbine flaps on that turbine blade rotate in unison to the closed position. In the closed position the full force of the ocean current contacts that turbine blade as no water current flow is allowed to pass through the turbine blade. Once each turbine blade rotates out of the directional current flow the turbine flaps on that blade begin to open. While each of the turbine blades front sides come in contact with the ocean current flow, the back side of the previous turbine blade is pressed against by the ocean current forcing the turbine flaps to rotate to the full open position. This is designed to do so to reduce drag as to be more efficient. The turbine flaps are pushed open by the same directional ocean current as it comes in contact with the back side of the turbine blade. As each turbine blade front side begins to rotate back in contact with the ocean current flow its attached turbine flaps start to close in unison. This process repeats itself in sequence perpetually keeping the center shafts spinning at a constant steady speed turning a generator.

The power transmission and distribution cable transmits the power generated from the power generator turbine to an electrical power conversion equipment installed in a substation on the land.

The present invention is also to provide a novel method of generating power from the deep ocean compared with traditional methods to reduce the cost and the difficulties associated with the construction of the power plant, and then to increase the engineering reliability and product firmness.

To achieve the purpose mentioned above, the method comprises steps of injecting water into the hollow tube turbine platform, submerging the hollow tube turbine platform, anchoring and settling the platform on the seabed, producing power, and testing and correcting stability of overall structure.

It is to be understood that not necessarily all such advantages may be achieved in accordance with anyone particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference the following drawings and detailed description.

Further objects and advantages of the present invention will become apparent from a description of the several embodiments as set forth in the following description and drawings.

DETAILED DESCRIPTION OF THE INVENTION

The following description includes the best mode presently contemplated for carrying out the invention. This description is not to be taken in a limiting sense, but is made merely for the purpose of describing the general principles of the invention. The scope of the invention should be determined with reference to the claims.

It is to be understood that the figures and descriptions of the present invention have been simplified to illustrate elements that are relevant for a clear understanding of the present invention, while eliminating, for purposes of clarity, many other elements found in typical hydrologic power generation systems. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
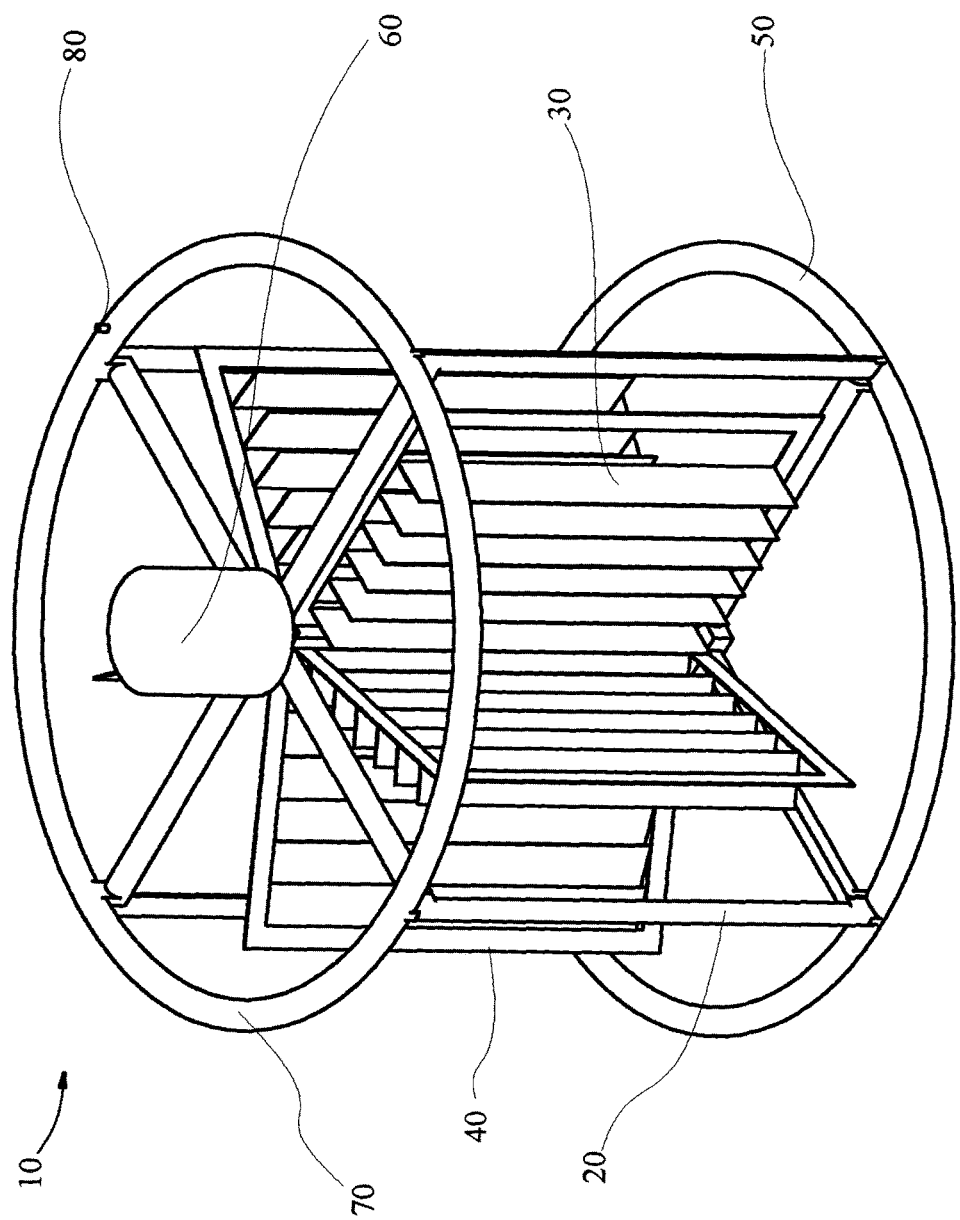
FIG. 1 is a perspective view of the power generator turbine device according to a preferred embodiment of the present invention.
Figure 2:
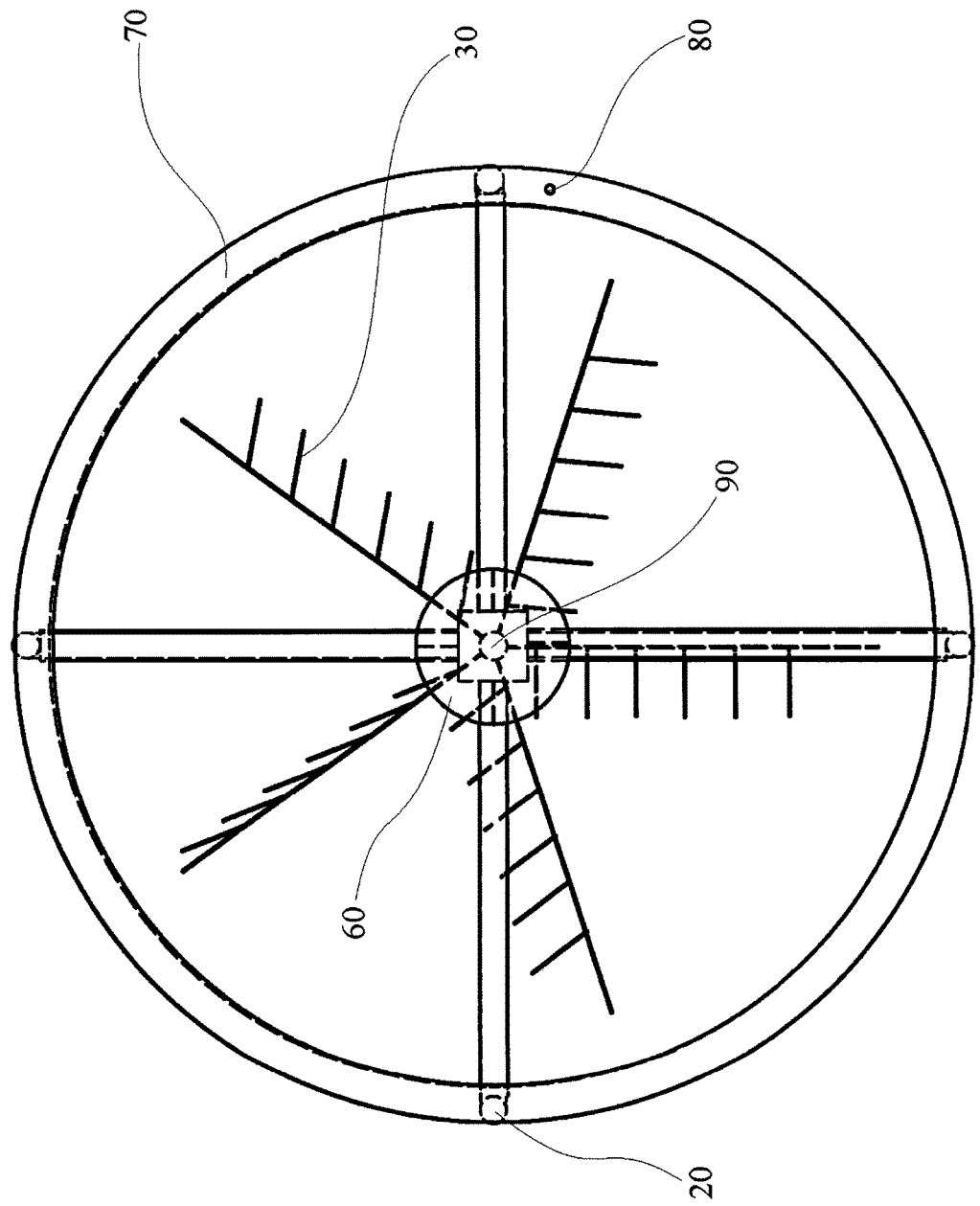
FIG. 2 is a top view of the power generator turbine device.

As illustrated in FIGS. 1 and 2, the present invention takes advantage of submarine principles to submerge the device 10 to a depth sufficient to take advantage of the increased pressure at deeper ocean levels. When the submarine valve 80 is opened, water will be filled in the hollow tube turbine platform from the top pontoon 70 to the side pontoon 20 ending at the bottom pontoon 50. It will be apparent to those of ordinary skill in the pertinent art that such a submerging system, and the turbine which is turned by the water flow being in contact with turbine blade 40, will be such that their use will be enabled in deep ocean waters, without the formation of fissures or excessive corrosion.

Still in FIGS. 1 and 2, the turbine blade 40 includes multiple moving turbine flaps 30. These flaps 30 open and shut in unison on the turbine blade 40. When each turbine blades front side is in contact with the ocean current flow during rotation, the turbine blades 40 rotate around the center shaft 90 as shown in FIG. 2 in unison to the closed position. In this closed position of the turbine flaps 30, the full force of the ocean current pushes the turbine blade 40 as no water current flow passing through the turbine blade 40. When the turbine blades 40 rotate, the power generator 60 is driven to generate electricity power.

Figure 3:
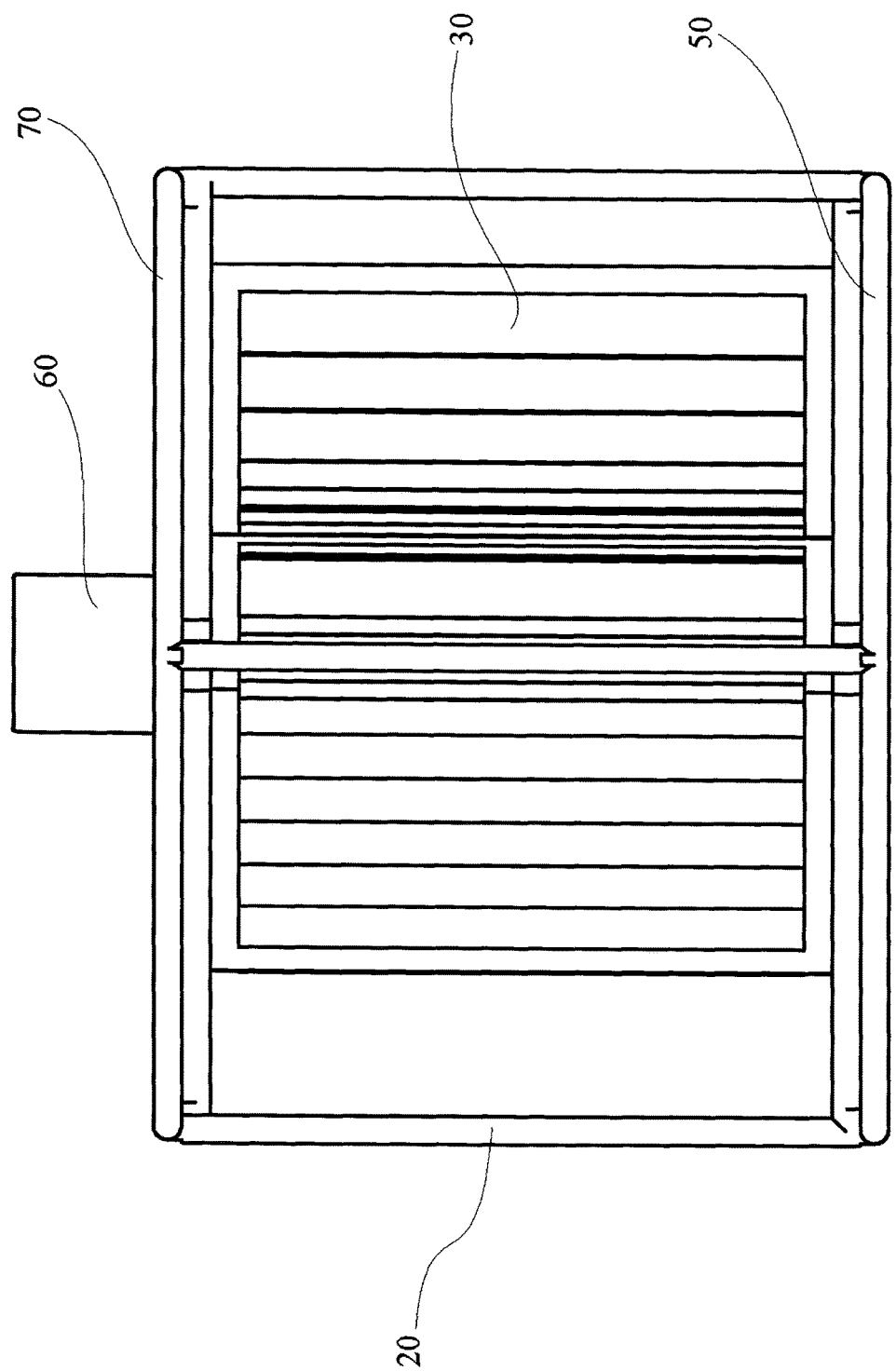
FIG. 3 is a side view of the power generator turbine device.

FIG. 3 shows the turbine flaps 30 in closed positions wherein the full force of the ocean current pushes the turbine blade to rotate to drive the power generator 60.

Figure 4:
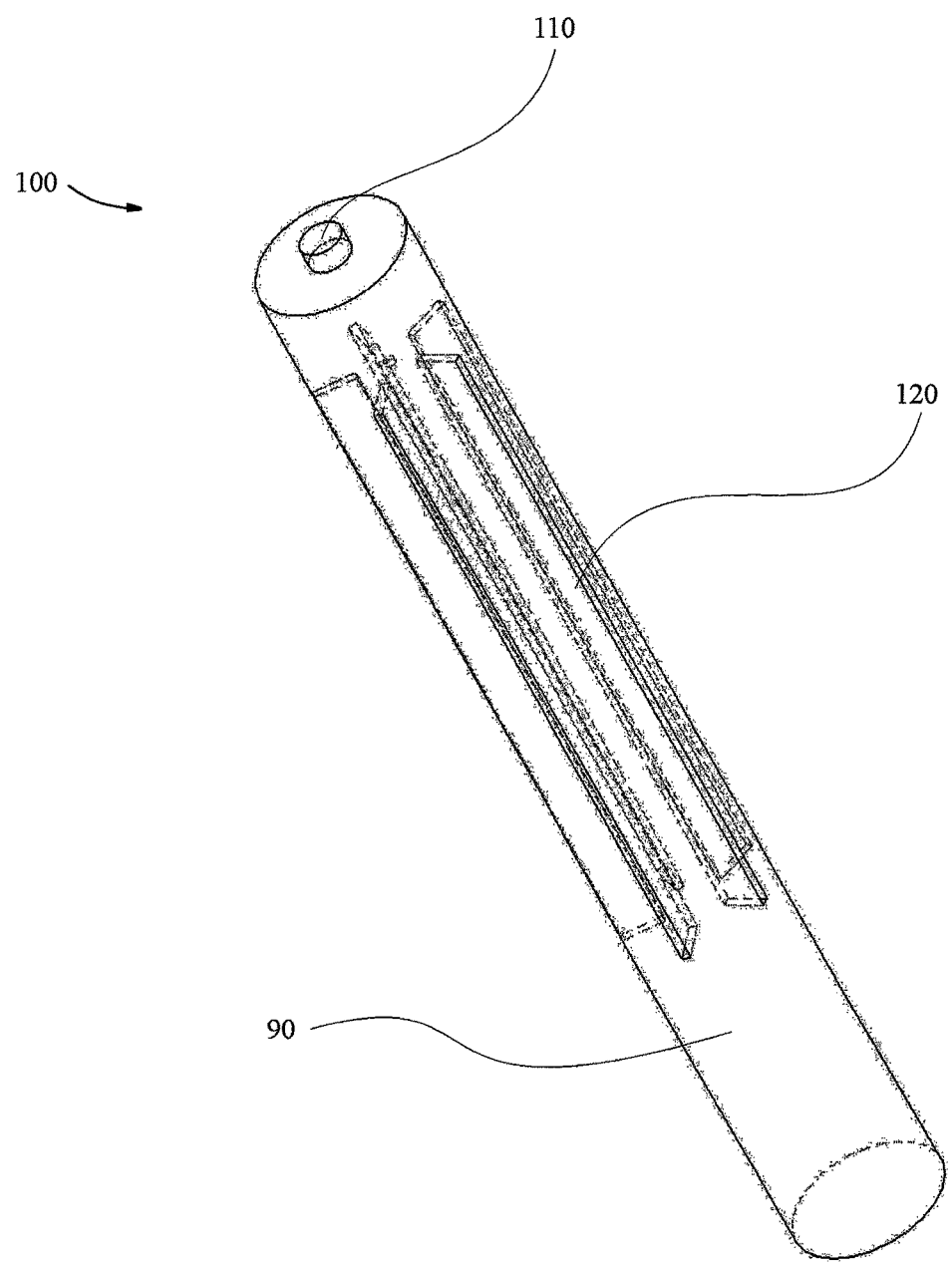
FIG. 4 is an embodiment of the power generator turbine device.

The center shaft, as illustrated in FIG. 4, has mounted turbine line attachment lines 120 alongside a vertical side of the shaft cylinder 90. The turbine blades 40 may preferably be mounted in a sufficiently rigid manner such that the intense pressure of deep ocean waters will not bend or break the turbine blades 40. The passing of ocean water current may then generate kinetic energy through any method known to those skilled in the art, such as by forcing the rotation of the turbine blades around the generator driveshaft 110. The turbine may, in turn, drive a power generator, and the generated electricity may be brought to the surface by a cabling known to those skilled in the art, such as standard submarine cabling.

Figure 5A:
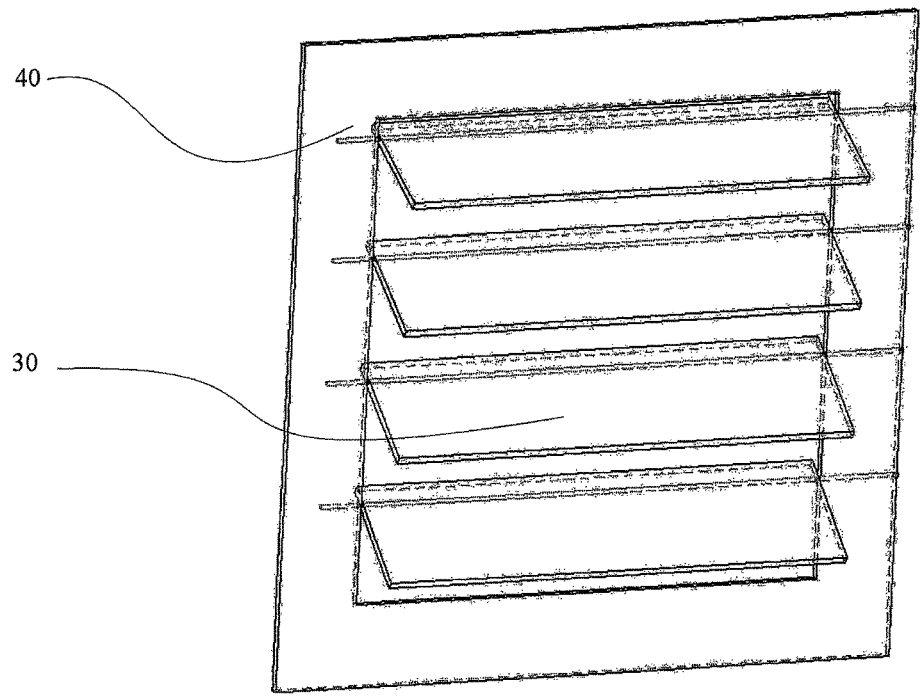
FIGS. 5A & 5B are turbine blades at close and open positions.
Figure 5B:
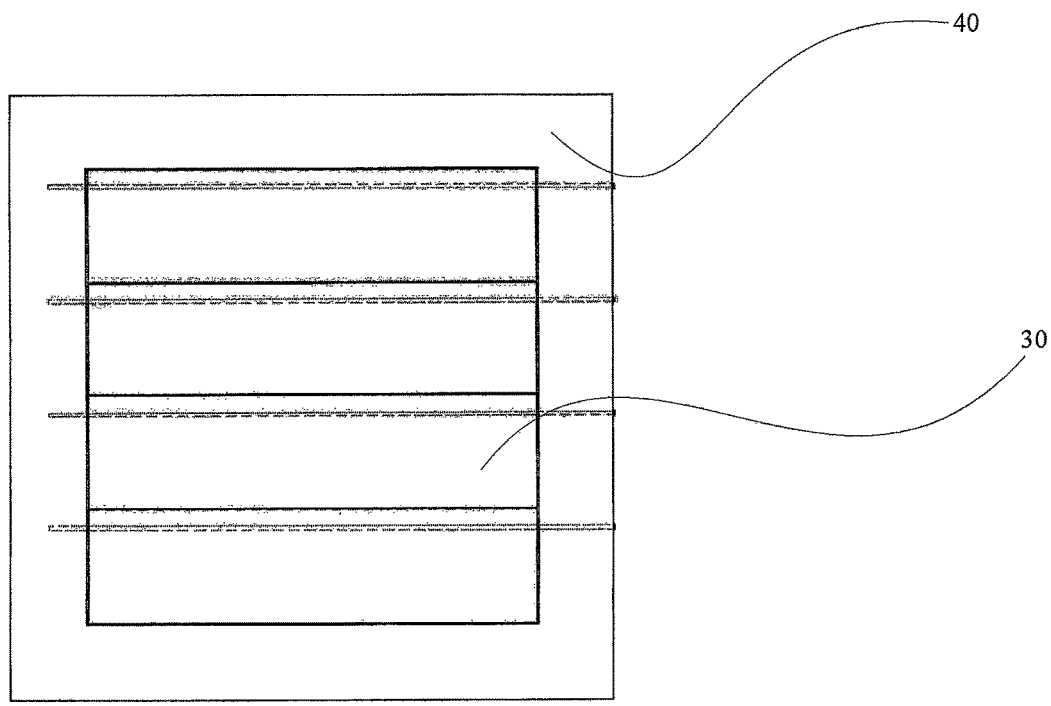

As further illustrated in FIGS. 5A-5B, the turbine blades 40 may take advantage of pressure of the ocean water current on the turbine flaps 30 when the turbine flaps 30 are fully closed.

Figure 6:
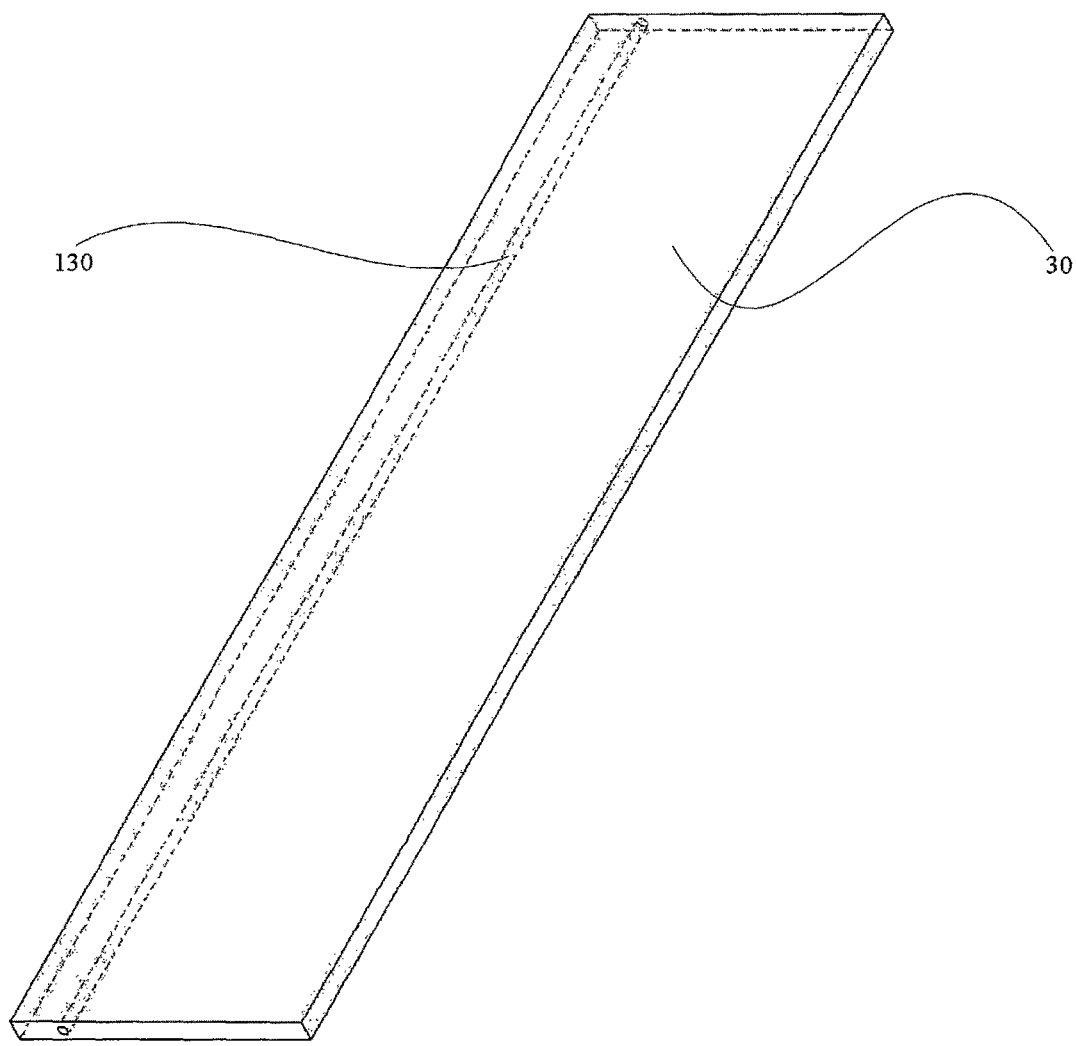
FIG. 6 is a perspective view of the turbine flap.

FIG. 6 shows the turbine flap 30 is rotably attached to the turbine blade 40 via a hinge pin 130.

Known methodologies that employ similar pump and pressurized seawater systems operate using water that is at significantly lower pressure than deep ocean water. Consequently, the deep ocean water of the present invention, and more precisely the pressure under which such deeper ocean water is, will allow for significant multiples of power to be generated by the present invention over those power generations made available in the prior art.

Having illustrated and described the principles of the present invention in a preferred embodiment, it will be apparent to those skilled in the art that the embodiment can be modified in arrangement and detail without departing from such principles. Any and all such embodiments are intended to be included within the scope of the following claims.

What is claimed is:

1. A deep ocean power generator turbine device, comprising:
    (a) a power generator for generating electricity power;
    (b) a hollow tube turbine platform having a top pontoon, side pontoon, and a bottom pontoon;
    (c) a submarine valve attached to said top pontoon for filling water into said hollow tube turbine platform from said top pontoon to said side pontoon ending at said bottom pontoon;
    (d) a plurality of turbine blade wherein each turbine blade further comprises a plurality of turbine flap, and wherein said plurality of turbine flap vertically attach to said each turbine blade via a hinge pin; and
    (e) a center shaft attached to said plurality of turbine blade, wherein said center shaft further comprises a shaft cylinder, a generator shaft, and a plurality of attachment line on a vertical side of said shaft cylinder.

2. The deep ocean power generator turbine device of claim 1, wherein said plurality of turbine blade rotate in sequence around said center shaft.

3. The deep ocean power generator turbine device of claim 1, wherein said center shaft attaches to said power generator.

4. The deep ocean power generator turbine device of claim 1, wherein said plurality of turbine flap open and shut in unison on said turbine blade.

5. The deep ocean power generator turbine device of claim 1, wherein said plurality of turbine blade attach to said center shaft via said plurality of attachment line.

\* \* \* \* \*